May 7, 1963
C. C. BORSA
3,088,549
CONTROL AND ALARM SYSTEM FOR BRAKE SHOE
LININGS OF MOTOR CARS AND THE LIKE
Filed June 23, 1960
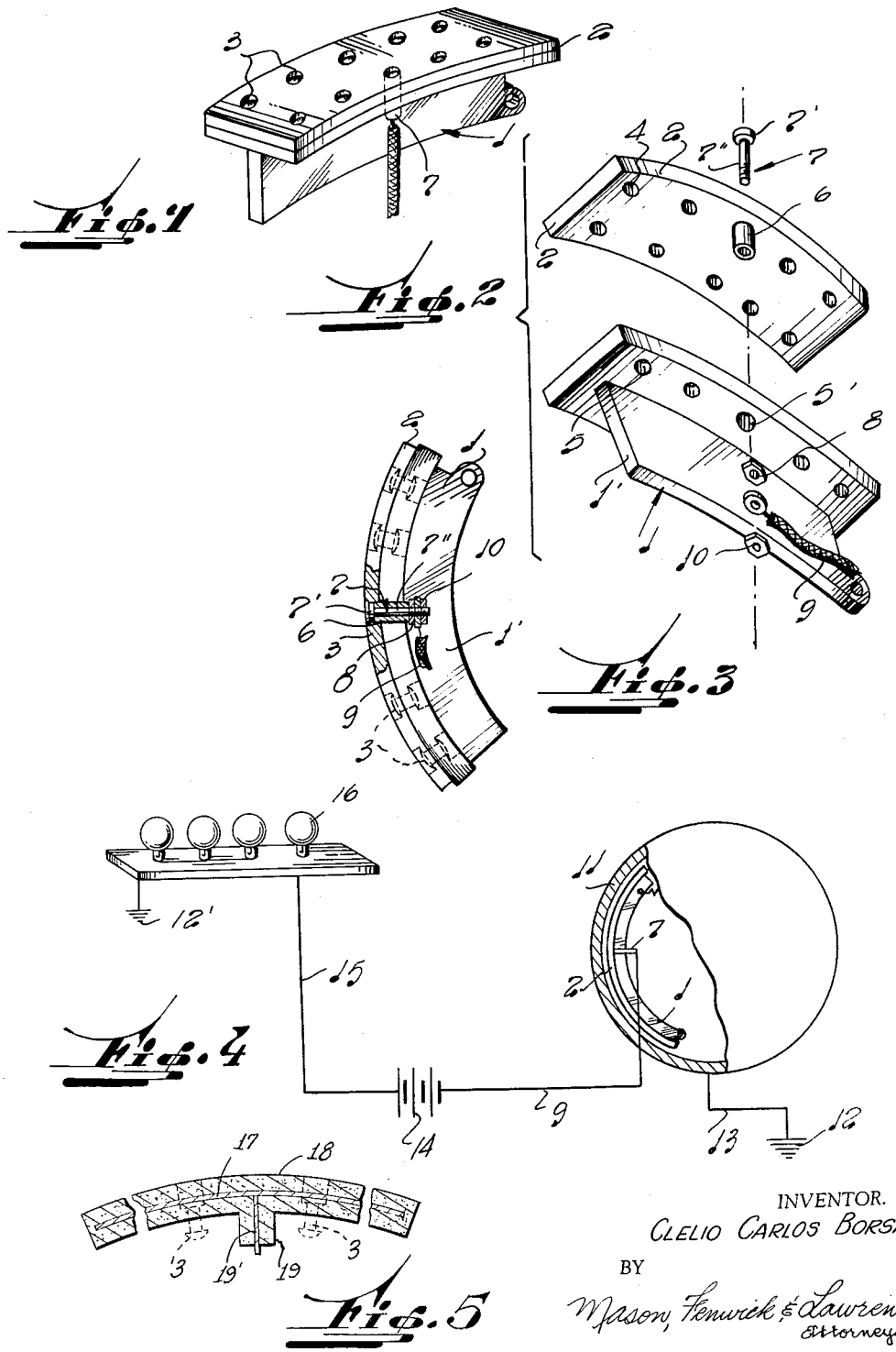
INVENTOR.
CLELIO CARLOS BORSA
BY
Mason, Fenwick & Lawrence
Attorneys 3,088,549
CONTROL AND ALARM SYSTEM FOR BRAKE SHOE LININGS OF MOTOR CARS AND THE LIKE
Clelio Carlos Borsa, 181 Avda. America, Porto Alegre, Brazil
Filed June 23, 1960, Ser. No. 38,255
Claims priority, application Brazil Aug. 25, 1959
1 Claim. (Cl. 188—1)

The present invention refers to a control and alarm system, which may be adapted to the lining of any existing brake shoe of the type used in motor cars and the like. The present invention also refers to a friction body or lining which may be manufactured with means so as to enable the formation of an alarm circuit or the like.

It is well known that in the brake drums used in motor cars and the like, the brake shoes are sheathed with a lining or friction body and when these linings or friction bodies wear out with the use, there is always danger that they are not replaced in due time and the drum becomes damaged.

On the other hand, due to the fact that in the orthodox arrangements there are no means for indicating when the linings should be replaced, the drums have often to be prematurely dismounted for inspection which causes unnecessary expenses.

In order to overcome these drawbacks it has been considered that it would be quite simple to insert within the lining and at a certain depth of the original frictional surface, a contact pin or the like which is connected to an electrical circuit, so that when the head of said contact pin or the like, due to the wear of the lining reaches the surface thereof, the electrical circuit is closed through the brake drum during a braking operation. Consequently, a lamp or any other alarm system is operated and the driver advised of the status of the brakes. A lamp may be, for instance, arranged in the dash-board of the car or, in a more developed embodiment, as many lamps as there are brake shoes.

In order to facilitate the comprehension of the present invention, reference will now be made, by way of example, to several specific embodiments in relationship to the accompanying drawings, wherein:

FIG. 1 is a somewhat schematical perspective view of a brake shoe with its lining or friction body including the features of the present invention.

FIG. 2 is an exploded perspective view of FIG. 1.

FIG. 3 is a side elevation partially in section of the embodiment shown in FIG. 1.

FIG. 4 is a schematical lay out of an alarm circuit for the present invention.

FIG. 5 is a longitudinal section of another type of lining which can be used if a new lining is to be manufactured.

As may be appreciated in FIGS. 1 to 3 the orthodox brake shoe 1 is provided with a lining 2, as is already well known in the art. More particularly, the lining is attached to the brake shoe 1 by means of a plurality of embedded rivets 3. Since such an arrangement is so well known, it is considered that any further detailed description is superfluous. In FIG. 2 the rivets are not shown, but in the lining or friction body 2 a plurality of openings 4 are shown, which coincide with the perforations 5 of the pertinent portions of the brake shoe 1. In one of said perforations 4, and in accordance with the present invention, a bushing 6 of insulating material is to be inserted and the length of said bushing 6 is such that it projects through the perforation 5' of the brake shoe 1 as may be best seen in FIG. 3.

Within said bushing 6, a contact pin 7 is to be inserted having a head 7' which is embedded in the lining 2 in a similar way as the head of a rivet, but usually slightly nearer the original friction surface than said rivet heads. The stem 7" of said contact pin 7 is longer than said bushing 6 so that it will project out of said bushing in spaced apart relationship with regard to the web or central member 1' (see FIG. 2) of the brake shoe 1. A first nut 8 is to be mounted on said stem 7", which to this end is screw threaded, so as to keep said contact pin 7 in proper place; thereupon the end of a first conductor 9 is to be mounted on said stem 7" and thereafter a second nut 10 is likewise to be screwed on said stem 7" so as to clamp said end of said first conductor 9.

It will already be visualized that upon the lining 2 wearing out, there will be a moment when the head 7' of the contact pin 7 is on surface level.

Referring now to FIG. 4, wherein an alarm circuit is shown in connection with the embodiment so far described in relationship with a schematically illustrated brake drum, it will be appreciated that the brake drum 11 is connected to chassis 12 by means of a second conductor 13. It is well known that the brake drum is usually made of steel and therefore electrically conductive.

Within the brake drum 11, the brake shoe 1 is mounted in its usual way having the contact pin 7 (only schematically shown) connected to said first conductor 9 which is furthermore connected to a supply source 14, such as a battery. Said supply source 14, is connected, through a third conductor 15, to one pole of a lamp 16 mounted on the dashboard 17, which is further connected to chassis 12'.

It will be appreciated that when the head 7' is flush with the surface of the lining 2, and the brake is applied, the alarm circuit is closed and lamp 16 will be lit whereby the driver is advised that the particular lining corresponding to said lamp 16 should be changed.

In the embodiment of FIG. 4 the dashboard 17 is shown with three additional lamps each connected to a surveying control-indicating system of a particular brake shoe, as will be obvious to those skilled in the art.

From the foregoing, it is evident, that when the brake shoe is not operated, the lamp 16 will not be lit.

Obviously, the lamps 16 may be replaced by any other type of alarm system such as an audible alarm device.

Furthermore it may be appreciated that the arrangement described may be applied to any existing brake shoe having already its orthodox lining. However, if a new lining is to be manufactured, it may be more convenient to replace the contact pin 7 by a conductive sheet 17 (see FIG. 5) which is embedded in the lining 18 during the manufacturing process thereof and is located depthwise of the lining 2 at a position similar to that of the contact pin head 7' to be closer to the original friction surface than heads of rivets 3. In this event, said lining will have a projecting portion 19, which replaces the bushing 6 of the previous by described embodiment and through which an end of the conductive sheet 19, more particularly projection 19', emerges and which may be connected to the first conductor 9.

The fact that in the embodiment of FIGS. 1 to 3 the the contact pin has been shown in the middle portion of the lining, does not tend to limit the application of said contact pin, inasmuch as it may well be located in any position within the lining 2.

Certain modifications may likewise be suggested, for instance, a pair of contact pins spaced apart and arranged at both ends of the lining may be used since usually the lining wears out first at one end and therefore the scope of the invention has to be interpreted in accordance with what is stated in the appendant claim.

I claim:

A unitary brake lining for an automotive brake shoe adapted to complete an electrical alarm circuit through a metal brake drum and produce a sensible indication when the brake lining has been worn away to a predetermined extent, the brake lining comprising a lining body of electrically insulative friction material having substantially uniformly spaced, parallel, rectangular inner and outer surfaces adapted respectively to be supported against the braking surface of a brake shoe and to be brought into braking contact with the brake drum, an electrically conductive sheet member substantially coextensive with said inner and outer surfaces incorporated in wholly embedded relation in said lining body and extending in parallelism with said surfaces in uniformly spaced relation therefrom so as to be electrically insulated from said surfaces by the material of said lining body, said lining body having openings extending therethrough perpendicular to said outer surface adapted to receive mounting rivets for securing the lining body to the brake shoe and including an annular outwardly facing shoulder in each opening for engagement with the heads of the mounting rivets positioned to locate the rivet heads between said sheet member and said inner surface, said lining body including an integral sleeve-like extension projecting substantially perpendicularly from said inner surface for a sufficient distance to pass through the brake shoe on which the lining is to be supported and having a bore extending centrally therethrough from said sheet member opening through an extend of said extension remote from said sheet member, and electrical connector means electrically communicating with said sheet member extending from said sheet member through the bore of said sleeve-like extension encased laterally in insulated relation by said extension for connection to an alarm circuit.

References Cited in the file of this patent

UNITED STATES PATENTS

| | | |
|---|---|---|
| 1,902,759 | Cataudella | Mar. 21, 1933 |
| 2,078,703 | Wisniewski | Apr. 27, 1937 |
| 2,146,357 | Schweikle | Feb. 7, 1939 |
| 2,217,176 | Madison | Oct. 8, 1940 |
| 2,636,090 | Branschofsky | Apr. 21, 1953 |

FOREIGN PATENTS

| | | |
|---|---|---|
| 1,108,284 | France | Aug. 24, 1955 |